April 6, 1937.　　　R. A. SWALM ET AL　　　2,076,256
MOUNT FOR WING GUNS
Filed Aug. 7, 1933　　　3 Sheets-Sheet 1

INVENTORS
ROBERT A. SWALM. and
CARL R. O. P. HEINTZE.
BY
ATTORNEYS.

April 6, 1937.  R. A. SWALM ET AL  2,076,256
MOUNT FOR WING GUNS
Filed Aug. 7, 1933  3 Sheets-Sheet 2
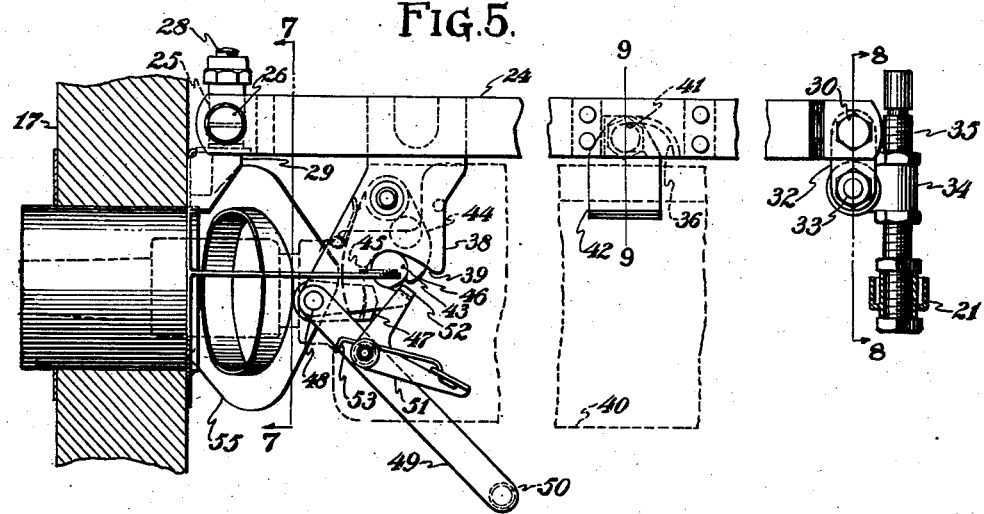
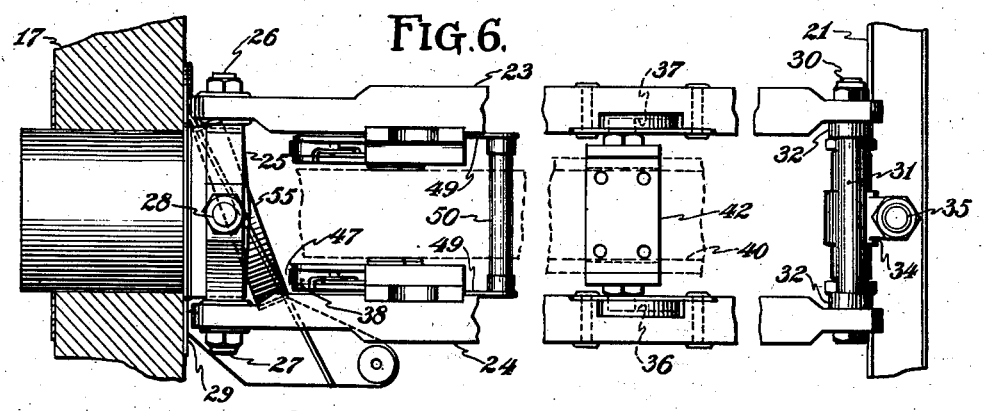
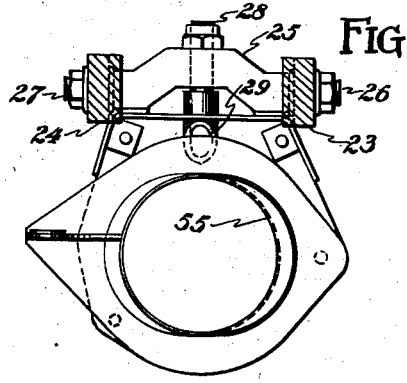
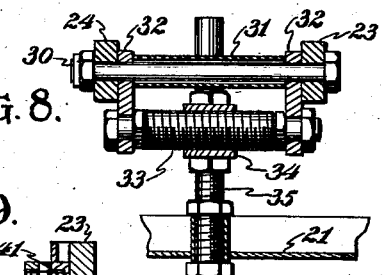
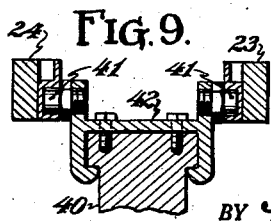
INVENTOR.
ROBERT A. SWALM
CARL R. O. P. HEINTZE.
BY
ATTORNEYS.

April 6, 1937.  R. A. SWALM ET AL  2,076,256
MOUNT FOR WING GUNS
Filed Aug. 7, 1933  3 Sheets-Sheet 3
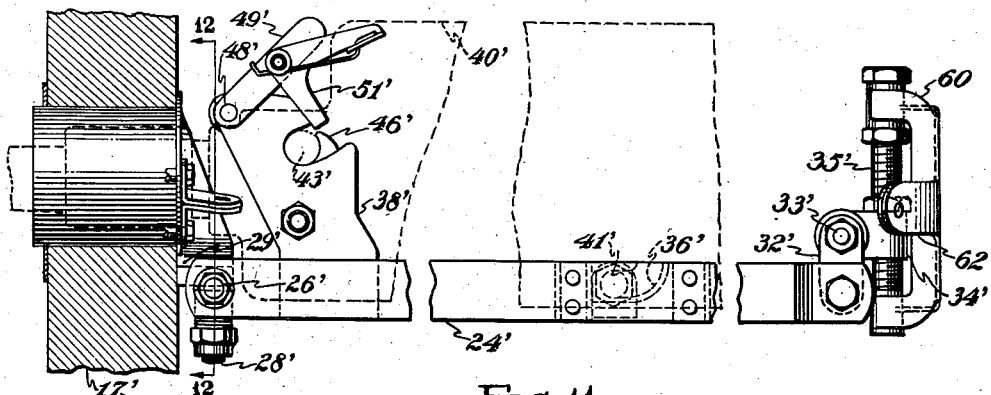
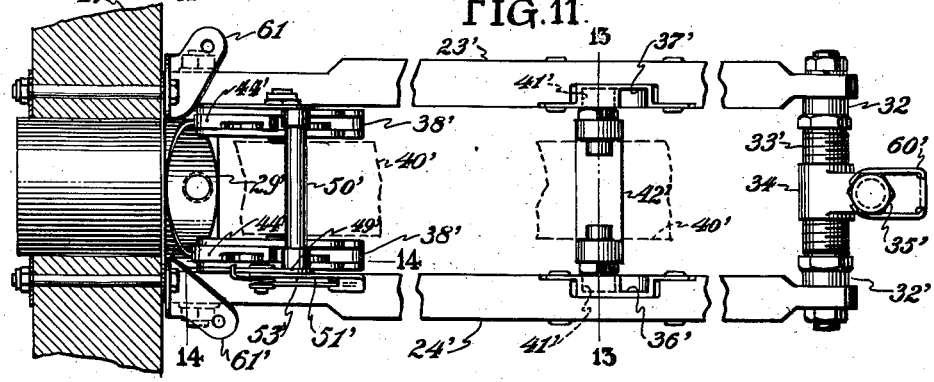
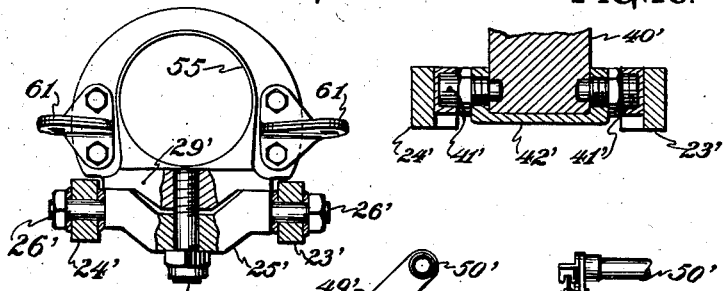
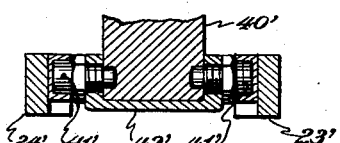
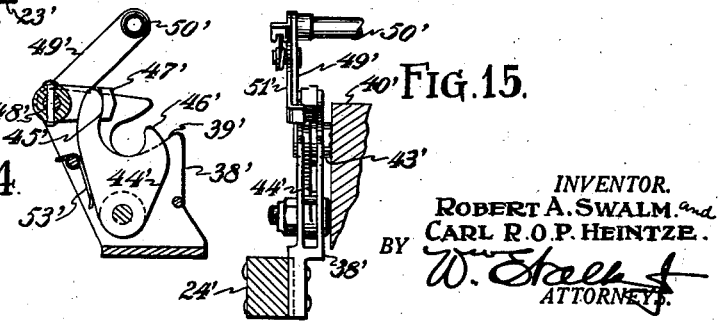
INVENTOR.
ROBERT A. SWALM and
CARL R. O. P. HEINTZE.
BY
ATTORNEYS.

Patented Apr. 6, 1937

2,076,256

UNITED STATES PATENT OFFICE 2,076,256

MOUNT FOR WING GUNS

Robert A. Swalm and Carl R. O. P. Heintze, Kenmore, N. Y., assignors, by mesne assignments, to Curtiss-Wright Corporation, a corporation of New York Application August 7, 1933, Serial No. 683,944

4 Claims. (Cl. 89—37)

This invention relates to armament for aircraft and more particularly provides improvements in mountings for aircraft machine guns. In the past, it has usually been the practice to mount fixed machine guns on the fuselage of an airplane with suitable synchronizing mechanism connected with the engine, so that the gun fires through the airplane propeller disk, between the blades. Although this practice has been fairly satisfactory, the current improvements provide machine guns carried in the wings of the airplane so that their line of fire is outside of the propeller disk, and hence there is no possibility that a misfire of the gun can damage the propeller. Such construction also enables more guns to be carried by the airplane. In this type of gun installation, the airplane as a whole is aimed, in order to aim the guns. In mounting fixed guns, it has been a regular practice to provide a trunnion attaching the forward portion of the gun to a structural member of the airplane, and to provide screw adustments attaching the rearward end of the gun to another structural part of the airplane. By altering the adjustments, the line of fire of the gun may be changed so that the line of fire at some fixed range will converge with the longitudinal axis of the airplane.

The gun is usually attached to its support by means of through bolts which, when it is necessary to remove and service the gun, are frequently difficult of removal, since the gun and its supports are usually located in rather cramped quarters. Also, the adjustment of the mounting parts may become disarranged, so that when the gun is replaced, it would be necessary to realign or resight the gun to obtain the correct line of fire.

It is an object of this invention to provide a mount for a fixed machine gun in an airplane from which the gun may be easily removed or on which the gun may be easily installed without the use of tools and without disturbing the position of adjustment of the gun mount, whereby the correct line of fire will be maintained regardless of how often the gun may be taken out for service.

A further object is to provide quickly releasable means whereby a machine gun may be removed from or installed in its mount.

A further object is to provide a gun mount adapted for use in the wing of an airplane and to provide adjusting mechanism for the gun mount so that the mounted gun may be adjusted for correct line of fire.

Another object is to provide, in the mechanism for releasing the gun from its mount, an automatic safety feature wherein it is impossible to place a cover on the wing surface over the gun until the gun shall have been locked in position, thereby providing a warning that the gun is not properly locked.

Still further objects are to provide for easy removal and replacing of the gun, an accessible adjusting mechanism for the line of fire of the gun, a gun mount adapted for use in either the upper or lower panels of a biplane, and to provide a gun mount which may be located along with the gun, completely within the confines of the wing structure so that there are no projections to interfere with the speed characteristics of the airplane.

Further objects will be apparent from a reading of the specification and claims.

Briefly, the gun mount comprises a relatively rigid frame supported at its forward end on a universal connection adjacent a forward wing spar. The rearward end of the frame is held either to the rearward wing spar or to a suitable extension therefrom, by means of adjusting screws located at right angles to each other whereby the frame may be moved in limited angles either vertically or horizontally to change its relative alignment with the wing. The frame is provided with a plurality of open-ended slots within which suitable lugs on the gun are adapted to engage when the gun is placed in the mount. A latch mechanism is adapted to hold certain of the lugs within their respective slots, whereby the gun as a whole is firmly held in fixed relation to the frame. The operating member for the latch mechanism is so arranged that when unlocked, it projects beyond the outer surface of the wing contour, and so that when locked, the operating member lies wholly within the wing. The space within the wing occupied by the gun and mount necessitates an opening in the wing surface which is adapted to be closed by a suitable cover. By the arrangement of the operating member, this cover can only be replaced when the latch mechanism is in its locked position.

For a clearer understanding of the invention, reference may be made to the drawings, in which similar numbers indicate similar parts, and in which:

Fig. 5 is an enlarged side elevation showing the details of the first embodiment of the gun mount;

Fig. 6 is a plan of the first embodiment of the gun mount;

Fig. 7 is a section on the line 7—7 of Fig. 5;

Fig. 8 is a section of a portion of the adjusting mechanism for the first embodiment of the gun mount;

Fig. 9 is a section on the line 9—9 of Fig. 5;

Fig. 10 is an enlarged side elevation of the second embodiment of the gun mount;

Fig. 11 is a plan of the second embodiment of the gun mount;

Fig. 12 is a section on the line 12—12 of Fig. 10;

Fig. 13 is a section on the line 13—13 of Fig. 11;

Fig. 14 is a section on the line 14 of Fig. 11; and

Fig. 15 is a section, viewed from the rear, of that portion of the mechanism shown in Fig. 14.

Figure 1:
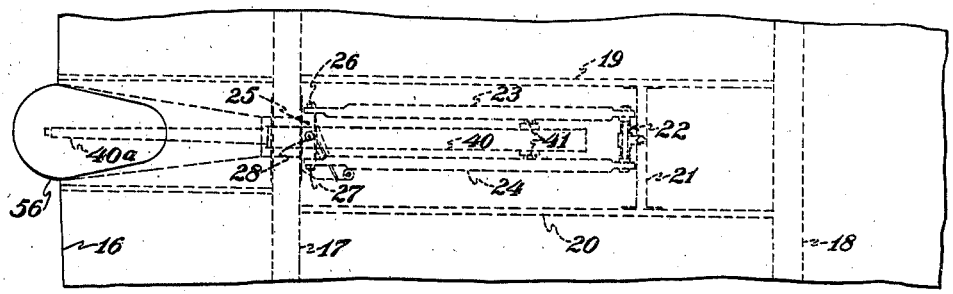
Fig. 1 is a plan of a portion of an airplane wing embodying a first form of the invention wherein the gun is adapted to be withdrawn through the lower surface of the wing.

As will be noted from the above, Figs. 1, 2, 5, 6, 7, 8, and 9 illustrate one embodiment of the invention wherein the gun mount is arranged toward the upper surface of an airplane wing and wherein the gun is adapted to be withdrawn through an opening in the lower surface of the wing. Figs. 3, 4, 10, 11, 12, 13, 14, and 15 show an alternative embodiment wherein the gun mount is arranged toward the lower surface of the wing and wherein the gun is adapted to be mounted and withdrawn through a suitable opening in the upper covering of the wing. The first embodiment will be described, and those points of difference between the first and second embodiments will then be fully explained.

An airplane wing 16, which may be either the wing of a monoplane or the upper or lower wing of a biplane, is provided with a conventional forward wing spar 17 and a rear wing spar 18. A pair of spaced braces 19 and 20, such as conventional compression ribs in the wing, extend between the spars 17 and 18. A cross brace 21 extends from the brace 19 to the brace 20 and provides an anchorage for a gun mount adjusting mechanism 22.

A pair of frame members 23 and 24 form the main portion of the gun mount and are joined at their forward ends by a yoke 25, the yoke 25 being pivoted to the members 23 and 24 as by bolts 26 and 27. Thus, the members 23 and 24 may oscillate slightly in a vertical plane about the yoke 25. The yoke, in turn, is carried on a vertical pivot 28 which is rigidly attached, by a fitting 29, to the wing spar 17.

At their rearward ends the members 23 and 24 are joined by a bolt 30 and sleeve 31 serving as a spacer between the members, and links 32 being arranged to oscillate about the bolt 30. Said links at their lower ends are journaled on a screw 33, which may be traversed laterally in a nut 34. This nut is provided with two threaded openings—one for the screw 33 and another, at right angles to the first, to accommodate a vertical screw 35 which may be journaled at its lower end in the brace 21. It will thus be apparent that the gun mount may be adjusted vertically and laterally to an extent limited by the length of the screws 35 and 33, by turning said screws in either direction. By the arrangement of the yoke 25 and the forward vertical pivot 28, the mount is held from possible wabbling from side to side.

The members 23 and 24 are provided toward their rearward ends with open-ended slots 36 and 37, these slots having their open ends facing rearwardly and downwardly. Toward the forward ends of the members 23 and 24, a pair of opposed plates 38 are attached, these plates extending downwardly from the frame members and having open-ended slots 39. These slots have their openings also facing rearwardly and downwardly. A machine gun 40 is provided with lugs or studs 41 which may be carried by a suitable fitting 42 screwed to the machine gun 40. These lugs may engage within the slots 36 and 37. Similar studs or lugs 43 are provided on the opposite sides of the forward end of the machine gun 40 to engage within the slots 39. Thus, it will be seen that when the machine gun is located so that the several lugs engage in the several slots, it attains a fixed location with respect to the gun mount, and more particularly, with respect to the members 23 and 24. The mechanism for holding the gun so that the lugs are retained in the slots comprises a hook 44 pivoted to each plate 38 and having a portion 45 against which the lug 43 may press when the machine gun is placed. Upon moving of the hook 44, a portion 46 of said hook embraces the lug whereby said lug is prevented from leaving the slot 39 unless said hook is likewise moved. A latch 47, pivoted at 48 to the plate 38, is arranged to hook over the portion 45 of the hook 44. When thus in place, the latch 47 prevents the lug 43 from coming out of the slot 39 and thus holds the gun 40 in its proper position. An operating member comprising an arm 49 is fixed to the pivot 48 so that when the arm 49 is swung about said pivot, the latch 47 is swung therewith. The mechanism above described is shown particularly in Fig. 5, and in that figure is shown as attached to the member 24. Such mechanism is duplicated on the member 23. Hence, there is an arm 49 for each member 23 and 24, these arms being joined at their outer ends for convenience by a handle 50, whereby both arms may be moved simultaneously. In order to more securely prevent the latch 47 from unlocking the gun, a bell crank lever 51 is pivoted to one of the arms 49, one end of the bell crank having a portion 52 adapted to hook over a portion of the plate 38 to prevent the arm 49 and hence, the latch 47 from disengaging the hook 44. The other arm of the bell crank 51 serves as a handle or trigger therefor, and this is normally held in a position of locking by means of a spring 53 engaging both the bell crank 51 and the arm 49.

Figure 2:
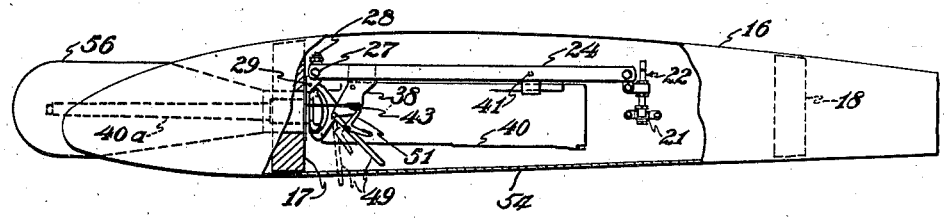
Fig. 2 is a side elevation partly broken away, of the gun mount embodiment of Fig. 1.
Figure 3:
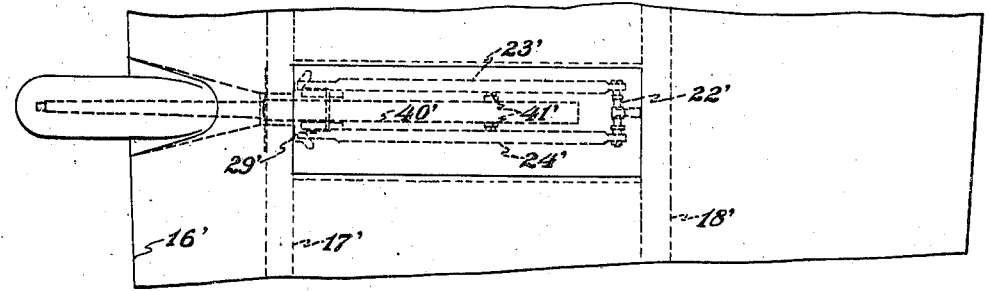
Fig. 3 is a plan of a portion of an airplane wing showing a second embodiment of the gun mount.
Figure 4:
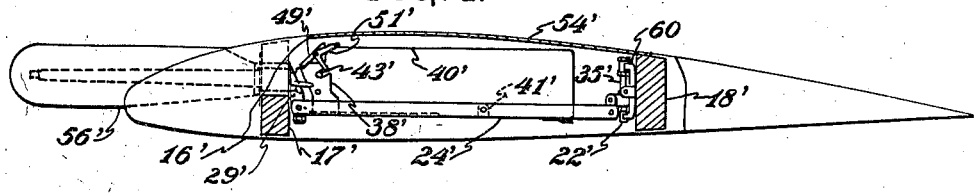
Fig. 4 is a side elevation partly broken away, of an airplane wing with the gun mount embodiment of Fig. 3.

By reference to Fig. 2, it will be apparent that a detachable cover 54 is arranged to cover the lower surface of the wing adjacent the gun mount. By removing this cover, and by depressing the handle portion of the bell crank 51 and by depressing the arm 49, the hook 44 is so released that the gun may be withdrawn, such withdrawal involving the disengagement of the lugs 41 and 43 from their respective slots 36, 37, and 39. Replacement of the gun is accomplished by reversing the procedure. It will be noted in Fig. 2 that the arm 49 in solid lines shows the position when the gun is locked in place and in such position, the arm 49 lies wholly within the confines of the wing. The dotted lines show the arm 49 in a position for installing or removing the gun and the proportions of said arm are so arranged that it projects below the contour of the wing surface in such position. Therefore, if the gun has been inserted and is not properly locked in place, it will be impossible to attach the cover 54, as the projecting length of the arm 49 prevents. When said arm is properly locked in place, the cover 54 may be installed.

A fitting 55 is attached to the fitting 29 and extends through a bore across the neutral axis of the spar 17, and thus provides a combination of guide and rest to facilitate insertion and removal of the gun. The gun barrel 40a projects through the wing spar and extends adjacent the leading edge of the wing 16. Normally, this barrel 40a may be protected by a fairing 56 arranged for easy removal should it be desired to fire the gun.

As previously indicated, the gun may be installed in or removed from the gun mount and when installed, always has a fixed and definite position with respect thereto. Alignment of the gun with respect to the airplane is effected by turning either or both of the screws 33 and 35, such screws affecting the position of the gun mount as well as of the gun. Therefore, since the position of the mount may be given a predetermined adjustment, the gun will always assume such adjustment when it is firmly seated in the gun mount. It will be noted that in the construction shown, the alignment adjustments for the gun are remote from the mechanism provided for securing the gun to the mount, and thus inadvertent spoilage of the mount adjustment is minimized. This constitutes a distinct improvement over previous gun mounts, since the adjusting mechanism and the gun attaching mechanism have either been one and the same unit or have been so closely adjacent to each other that one is easily interfered with while the other is being operated.

The above description applies virtually in toto to the alternative embodiment of the gun mount shown in Figs. 3, 4, and 10 to 15, inclusive. The numbers in the second embodiment are primed, but designate corresponding elements of the first embodiment. It will be noted that in Figs. 3 and 4, the wing spars 17' and 18' are closer together, whereby the screw 35' is held in a fitting 60 attached directly to the rear spar 18'. The cover 54' in this embodiment is applied to the top surface of the wing and the members 23' and 24' support the gun 40 on top thereof instead of below, as in the previous embodiment. The arm 49', then, is arranged to be operated from the top of the wing, and in unlocked position projects above the top surface of the wing to prevent application of the cover 54' without first fully locking the gun in position.

It will be noted that the fitting 29' may be combined with fittings 61, and fittings 62 may be combined with the fitting 60, these fittings 61 and 62 being adapted for drag bracing or the like in the wing structure.

The principal elements involved in both embodiments of the gun mount may readily be made interchangeable and obviously, it would require only minor changes to adapt either gun mount for use in an installation where the gun is to be removable from either one or the other surface of the airplane wing.

Although the embodiments shown are particularly applied to an airplane wing, it is apparent that the mechanisms and principles involved therein may be used for mounting machine guns on other parts of an airplane or on other forms of vehicles.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

What is claimed is:

1. In an aircraft wing, a gun mount adapted to releasably hold a gun within said wing, said wing having an access opening for removal and placement of said gun, a cover for said access opening, and manually operable means for releasing said gun from said mount, said manual means including a member adapted, when said gun is held in said mount, to lie wholly within said wing whereby said cover may be placed over said access opening, said member being adapted to project from said wing when said gun is not held by said manual means, whereby said cover cannot be placed over said opening.

2. In an aircraft wing, a gun mount adapted to releasably hold a gun within said wing, means forming part of said mount for holding said gun firmly in said mount, said means having a member adapted to lie outside the contour of said wing when said means is not firmly holding said gun and adapted to lie wholly within said wing when said means firmly holds said gun.

3. In a fixed gun mount for an aircraft wing comprising spaced front and rear spars, said front spar having a fore and aft opening, a gun having a barrel adapted to be inserted through said spar opening, a frame attached at its forward and rearward ends to said front and rear spars, and releasable means for mounting the breech end of said gun to said frame, said means comprising lugs carried by said gun, said frame having slots within which said lugs are adapted to be slid after insertion of the gun barrel through said spar opening.

4. In a fixed gun mount for an aircraft wing comprising spaced front and rear spars, said front spar having a fore and aft opening, a gun having a barrel adapted to be inserted through said spar opening, a frame attached at its forward and rearward ends to said front and rear spars, releasable means for mounting the breech end of said gun to said frame, said means comprising lugs carried by said gun, said frame having slots within which said lugs are adapted to be slid after insertion of the gun barrel through said spar opening, means for holding certain of said lugs within certain of said slots, and means for effecting limited adjustment of the position of said frame relative to said spars, said last named means being remote from and wholly independent of said lug holding means.

ROBERT A. SWALM.
CARL R. O. P. HEINTZE.